US006344280B1

(12) United States Patent
Muramatsu et al.

(10) Patent No.: US 6,344,280 B1
(45) Date of Patent: Feb. 5, 2002

(54) SWASH-PLATE OF SWASH-PLATE TYPE COMPRESSOR

(75) Inventors: Syogo Muramatsu; Masanori Akiduki; Hiroaki Kayukawa; Hideki Mizutani; Manabu Sugiura; Hiroyuki Nakaima, all of Aichi (JP)

(73) Assignees: Taiho Kogyo Co., Ltd., Toyota; Kabushiki Kaisha Toyoda Jidoshokki Seisakusho, Kariya, both of (JP)

( * ) Notice: Subject to any disclaimer, the term of this patent is extended or adjusted under 35 U.S.C. 154(b) by 0 days.

(21) Appl. No.: 09/424,710

(22) PCT Filed: Mar. 26, 1999

(86) PCT No.: PCT/JP99/01541

§ 371 Date: Nov. 29, 1999

§ 102(e) Date: Nov. 29, 1999

(87) PCT Pub. No.: WO99/50556

PCT Pub. Date: Oct. 7, 1999

(30) Foreign Application Priority Data

Mar. 27, 1998 (JP) .......................................... 10-080660
Nov. 5, 1998 (JP) .......................................... 10-314565

(51) Int. Cl.[7] ........................... B32B 15/20; F04B 1/18; C22C 21/02; F16C 17/00; C23C 4/06

(52) U.S. Cl. ....................... 428/553; 428/564; 428/568; 428/569; 428/652; 428/653; 428/654; 428/937; 75/231; 75/249; 92/71

(58) Field of Search ................................ 428/553, 564, 428/568, 569, 652, 653, 654, 937, 647, 648, 646; 75/231, 249; 92/71

(56) References Cited

U.S. PATENT DOCUMENTS 5,056,417 A * 10/1991 Kato et al.
5,089,354 A 2/1992 Nakashima et al.
5,279,638 A 1/1994 Asada et al.
5,655,432 A * 8/1997 Wilkosz et al.
5,864,745 A 1/1999 Kawagoe et al.
5,911,809 A * 6/1999 Cordy
6,090,497 A * 7/2000 Mori et al.
6,123,009 A * 9/2000 Kanayama et al.
6,136,454 A * 10/2000 Cordy

FOREIGN PATENT DOCUMENTS

EP 0 620 286 A1 10/1994
JP 2-107738 4/1990
JP 8-199327 8/1996
JP 9-279319 A 10/1997
JP 10-205437 A 8/1998
WO 95/25224 9/1995
WO 96/36459 11/1996

* cited by examiner

*Primary Examiner*—Deborah Jones
*Assistant Examiner*—Jason Savage
(74) *Attorney, Agent, or Firm*—Armstrong, Westerman, Hattori, McLeland & Naughton,LLP

(57) ABSTRACT

A swash plate for a swash plate compressor, wherein aluminum alloy containing 12 to 60% of Si and, as required, 0.1 to 30% of Sn is sprayed onto the iron or aluminum base plate of the swash plate compressor to form a seizure-resisting and abrasion-resisting surface layer dispersed with granulated Si.

11 Claims, 2 Drawing Sheets

SWASH-PLATE OF SWASH-PLATE TYPE COMPRESSOR

TECHNICAL FIELD

The present invention relates to a swash plate of a swash-plate type compressor. More particularly, the present invent ion relates to a surface-treating technique for outstandingly improving the sliding properties of a swash plate which consists of iron- based or aluminum-based material.

BACKGROUND TECHNIQUE

In the swash-plate type compressor, the swash plate 2 is rigidly secured obliquely to a rotary shaft 1 as shown in FIG. 1. Alternatively, the swash plate is secured obliquely to a rotary shaft in such a manner that its slanting angle is variable. The compression and expansion are carried out by means of rotating the swash-plate which increases or decreases the volume of partition space within a compressor, depending upon the rotation of the rotary shaft. Such swash plate is caused to slide on a shielding member referred to as a shoe 3. Gas-tight sealing between the swash plate and the shoe enables the compression and expansion of the cooling medium in the stated space. 4 is a ball.

A noteworthy point in the sliding conditions of a swash-plate is that, during the initial operational period of a compressor, the cooling medium reaches the sliding part prior to the lubricating oil reaching the sliding part between the swash plate and the shoe; thus the cooling medium has a rinsing effect on the lubricating oil which remains on the sliding part, with the result that the sliding condition is a dry condition free of lubricating oil. The sliding condition requirements of the swash plate are therefore very severe.

The sliding properties, which are required for a swash-plate used under the conditions described above, are seizure resistance, wear resistance, and the like. Proposals have thus been made to add hard matters into the aluminum material for enhancing the wear resistance, to improve the material of the swash plate, and to subject an iron-based swash-plate to heat treatment for enhancing the hardness and hence wear-resistance. In addition, the following surface treating methods are also proposed.

One of the present applicants proposed in Japanese Unexamined Patent Publication No. Sho51-36611 to bond the sintered Cu material on the shoe in the case of an iron-based swash plate. That is, an iron-based swash plate was heretofore subjected to hardening treatment. However, when the material of the opposed member, i.e., the shoe, is an iron-based material, the sliding takes place between identical kinds of materials thereby involving a problem that seizure is liable to occur. Sintered copper alloy is used for the opposing material (shoe) opposed to an iron-based swash plate, so as to avoid the above-mentioned problem.

In addition, it was also proposed to apply tin plating on the iron-based swash-plate so as to avoid the sliding between identical kinds of materials and hence to enhance the seizure resistance. Since the tin plating applied on an iron-based swash-plate is soft, a problem that arises is insufficient wear-resistance.

The eutectic or hyper-eutectic Al—Si based aluminum alloy, which is produced by casting or forging, exhibits excellent wear-resistance. Its production becomes, however, difficult, when the Si content exceeds 15%. The wear resistance of this alloy is, therefore, limited by the Si amount.

Recently, powder-metallurgy products utilizing a melt-quenched powder (for example Japanese Patent Publication No. 2535789) are proposed.

Since the Si content is very high, as much as from 14 to 30%, the wear resistance is greatly enhanced. However, the resultant alloy must be subjected to such working as hot-press followed by hot-extrusion. Therefore, in order to produce relatively large-sized parts, such as a swash plate, investment in installation of large-capacity equipment such as a press and an extruder is necessary. Cost competitiveness, therefore, is lowered.

DISCLOSURE OF INVENTION

It is, therefore, an object of the present invention to provide on the surface of an iron or aluminum-based swash-plate a surface-layer having improved both seizure-resistance and wear-resistance, thereby enhancing the performance and reliability of a swash-plate type compressor.

The present inventors carried out, therefore, research so that, the Al—Si aluminum-alloys based sliding material in a eutectic region or a hyper-eutectic region can be formed as a sliding layer on the surface of a swash plate by means of a simple method; and, considerably improved properties over those of the conventional various sliding layers are demonstrated.

The present inventors energetically carried out experiments and discovered that the flame-sprayed Al—Si based aluminum alloys in a eutectic region or a hyper-eutectic region exhibits improved adhesiveness with a substrate; and, the Si particles are refined. The present invention was thus completed.

Namely, the present first invention is a swash plate of a swash-plate type compressor, characterized in that a flame-sprayed layer deposited on the substrate contains from 12 to 60% by weight of Si, the balance being essentially Al, and has the granular Si particles dispersed in the matrix thereof. The present second invention is a swash plate of a swash-plate type compressor, characterized in that a flame-sprayed layer deposited on the substrate contains from 12 to 60% by weight of Si, from 0.1 to 30% by weight of Sn, the balance being essentially Al, and has the granular Si particles and Sn phase dispersed in the matrix thereof.

The flame-spraying (spraying) is based on the definition in the Glossary Dictionary of JIS Industrial Terms, 4 th edition, page 1946 and indicates that "material is converted to molten or half-molten state by a heat source and is blown onto a substrate to form a film." More specifically, the "material" is aluminum-alloy or its raw material, for example, Al and Si powder. The half-molten state indicates such a solid-liquid coexisting state as is realized in a high-Si Al—Si alloy, i.e., a material having high melting-point. The half-molten state indicates that a portion of the powder does not melt, as is explained hereinbelow.

The present invention is explained in detail hereinafter. The percentage is weight % unless otherwise specified.

EMBODIMENTS OF INVENTION

According to the Al—Si based alloy of the present first invention, Si in granular form is dispersed in the aluminum matrix finely and in a large amount. Thus, Si enhances the hardness and hence wear-resistance of the alloy. In addition, the granular Si particles disperse finely in a large amount and suppress the adhesion between the aluminum matrix and a shoe and hence seizure due to such adhesion.

EP 0713972A1 filed by the present applicants provides a detailed explanation of the flame-sprayed copper alloy by referring to an example of Cu—Pb alloy. The rapid cooling and solidification of molten particles is common in the Al—alloy example. One feature of the flame-sprayed Al—Si alloy is that an additive element (Si) has a higher melting point than that of the matrix element (Al). As a result, Si in granular form is finely dispersed in the aluminum matrix in a large amount. Thus, the effect is obtained such that Si enhances the hardness and hence wear-resistance of the alloy.

In the present invention, the granular Si particles do not have the same shape as seen in the primary Si of the conventional melted alloy or the Si particles of the rolled alloy. They have a one-directional, lengthwise property. Rather, the granular Si particles of the present invention have spheroidal, nodular, polygonal or irregular shapes, not classified as the former three shapes, and have almost the same size in any direction. Furthermore, a noteworthy distinction between the primary Si and eutectic Si seen in the conventional melted alloys disappears in the case of the present invention.

When the Si content of the aluminum-alloy according to the present invention is less than 12%, the enhancement effects of wear resistance and seizure resistance are slight. On the other hand, when the Si content exceeds 60%, the strength so drastically lowers as to impair wear resistance. A preferable Si content is from 15 to 50%. When the size of Si particles exceeds 50 μm, separation of the Si particles is liable to occur. A preferable size is from 1 to 40 μm.

Next, the Al—Si—Sn based alloy of the present second invention exhibits improved wear-resistance and seizure-resistance. The shape and content of Si as in the description of the first invention are common. Sn is a component for imparting the lubricating property and compatibility. Sn preferentially adheres to the shoe and impedes the sliding of materials of the same kind, i.e., Al adhering to the Al of the bearing, with the result that the seizure resistance is enhanced. When the Sn content is less than 0.1%, it is not effective for enhancing the lubricating property and the like. On the other hand, when the Sn content exceeds 30%, the strength of the alloy is lowered. A preferable Sn content is from 5 to 25%. The morphology of the Sn phase in the layer is elongated flaky. This morphology seems to be preferable in the light of the lubricating property.

The aluminum alloy according to the present first and second invention can contain the following optional elements.

Cu: Cu is solid-dissolved in the aluminum matrix at super-saturation and thus enhances its strength. Cu thus suppresses adhesive wear of aluminum and wear due to separation of Si particles. In addition, a part of Cu forms with Sn, a Sn—Cu intermetallic compound and hence enhances the wear-resistance. However, when the Cu content exceeds 7.0%, the alloy is hardened too much to provide appropriate sliding material. A preferable Cu content is from 0.5 to 5%.

Mg: Mg is combined with a part of Si and forms an Mg—Si intermetallic compound. Mg, thus, enhances the wear resistance. However, when the Mg content exceeds 5.0%, the coarse Mg phase formed impairs the sliding properties.

Mn: Mn is solid-dissolved in the aluminum matrix at super-saturation and thus enhances its strength. The effects attained by Mn are the same as those by Cu. However, when the Mn content exceeds 1.5%, the alloy is hardened too much to provide appropriate sliding material. A preferable Mn content is from 0.1 to 1%.

Fe: Fe is solid-dissolved in the aluminum matrix at super-saturation and thus enhances its strength. The effects attained by Fe are the same as those by Cu. However, when the Fe content exceeds 1.5%, the alloy is hardened too much to provide appropriate sliding material. A preferable Fe content is from 0.1 to 1%.

Ni: Ni is solid-dissolved in the aluminum matrix at super-saturation and thus enhances its strength. The effects attained by Ni are the same as those by Cu. However, when the Ni content exceeds 8%, the alloy is too hardened to provide appropriate sliding material. A preferable Ni content is from 0.1 to 5%.

Subsequently, the formation of a sliding layer by flame spraying, which is common in the present first and second invention, is described.

In the present invention, various flame-spraying methods listed in FIG. 2 of Tribologist, ibid. page 20, FIG. 2 can be employed. Among them, the high-velocity oxyfuel flame-spraying method (HVOF, high velocity oxyfuel) can be preferably employed. It seems that the characterizing morphology of the Si and Sn phases can be obtained by this method, since it has the features described on page 20, right-hand column, lines 4 through 13 of Tribologist, ibid. Flame-sprayed Al is so rapidly cooled and solidified that a large amount of Si is solid-dissolved to harden Al. It has, therefore, the feature of holding the Si particles at high strength. Separation of Si particles and the wear due to such separation can, therefore, be suppressed.

An atomized powder of alloys such as Al—Si alloy, Al—Si—Sn alloy and the like can be used as the flame-spraying powder. These atomized powders may be completely melted on the substrate and then solidified.

Alternatively, a partly unmelted atomized powder may be applied on the substrate, so that the unmelted structure of powder remains.

The flame-spraying conditions are preferably: from 0.45 to 0.76 MPa of the oxygen pressure; from 0.45 to 0.76 MPa of fuel pressure; and from 50 to 250 mm of flame-spraying distance. A preferable thickness of the flame-sprayed layer is from 10 to 500 μm, particularly from 10 to 300 μm.

The hardness of the flame-sprayed alloy is in a range of from Hv100 to 600. Since the hardness of the conventional 12% Si-containing alloy is Hv70 to 150, the flame-sprayed layer according to the present invention can be said to be very hard.

Various metal substrates, such as iron, copper, aluminum and the like can be used as the substrate to form a flame-sprayed alloy thereon.

When the surface of a substrate is roughened by means of shot-blasting and the like, to preferably Rz 10 to 60 μm of surface roughness, then the adhesive strength of the film can be increased. More specifically, the measurement of adhesive strength of a film by a shear-fracture testing method revealed that: adhesive strength of a flame-sprayed Ni film on the shot-blasted steel substrate was 30 to 50 MPa; while the adhesive strength of the film according to the present invention was 40 to 60 MPa. This is higher than that of the flame-sprayed Ni film, which has been heretofore reputed to have good adhesiveness.

Heat treatment can be applied to the flame-sprayed alloy to adjust the hardness.

The adhesion strength of the flame-sprayed layer and substrate is created by the alloy formation between the aluminum (that is, the matrix of the flame-sprayed layer) and the metal of the substrate which fuse and diffuse with one another. On the other hand, a dispersion phase such as Si, seems to lack such function and hence does not contribute to the adhesion strength. Since Sn and Si tend to decrease the adhesiveness as described above, the adhesion strength can be enhanced by means of forming such a concentration gradient so that the concentration of these elements increases continuously or non-continuously in the direction from the substrate side toward the surface. As a result, the flame-sprayed layer in contact with the substrate is of a pure Al alloy having a low concentration of the secondary-phase forming element such as Si. Such a concentration gradient can be formed by means of varying the blending composition of the flame-spraying powder.

In the case of using the flame-sprayed alloy without application of an overlay, the flame-sprayed surface is preferably finished to Rz 3.2 μm or less. In the case of using the overlay, various soft coatings exhibiting excellent compatibility, such as Sn, Pb—Sn, $MoS_2$, and $MoS_2$-graphite-based coating, can be used so as to enhance the seizure-resistance.

The shoe per se is known. It is shown for example in Japanese Unexamined Patent Publication No. 51-36611 filed by the present applicants. Any material, of which the main component is iron, can be used as the iron-based material. Bearing steel is, however, preferable. In addition, the production method of a shoe is not at all limited. Such techniques as rolling, forging, powder-metallurgy, surface-hardening can be optionally employed.

The present invention is described by way of examples.

BEST MODE FOR CARRYING OUT INVENTION

EXAMPLE 1

Figure 1:
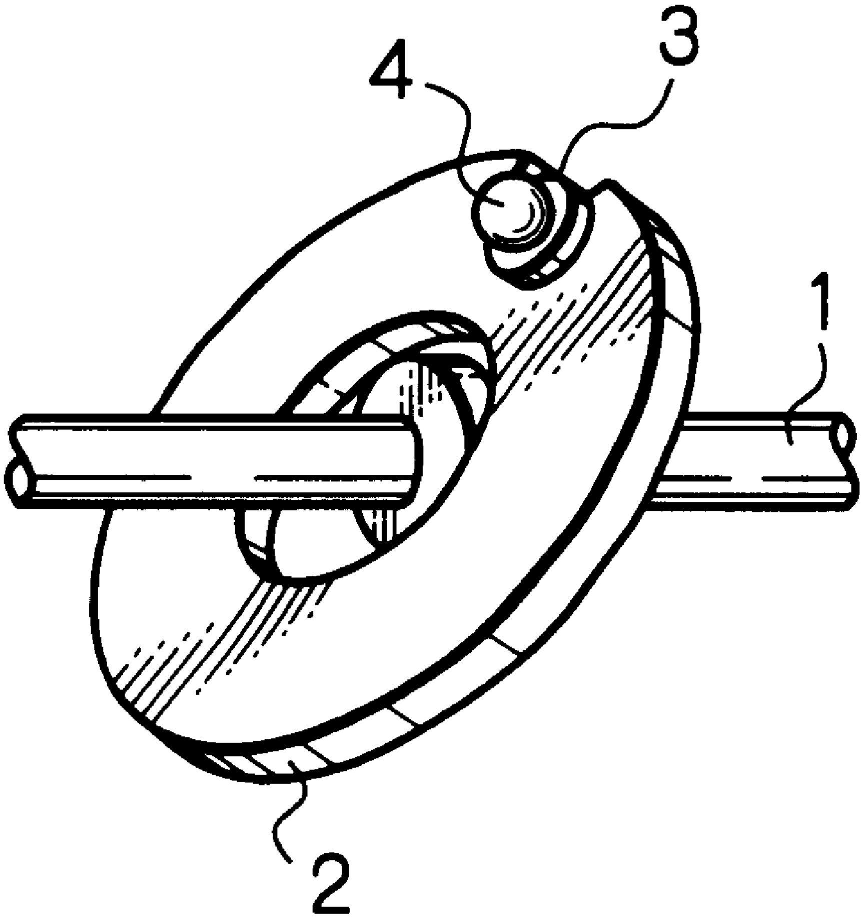
FIG. 1 is a drawing showing a swash plate, a rotary shaft and a shoe of the swash-plate type compressor
Figure 2:
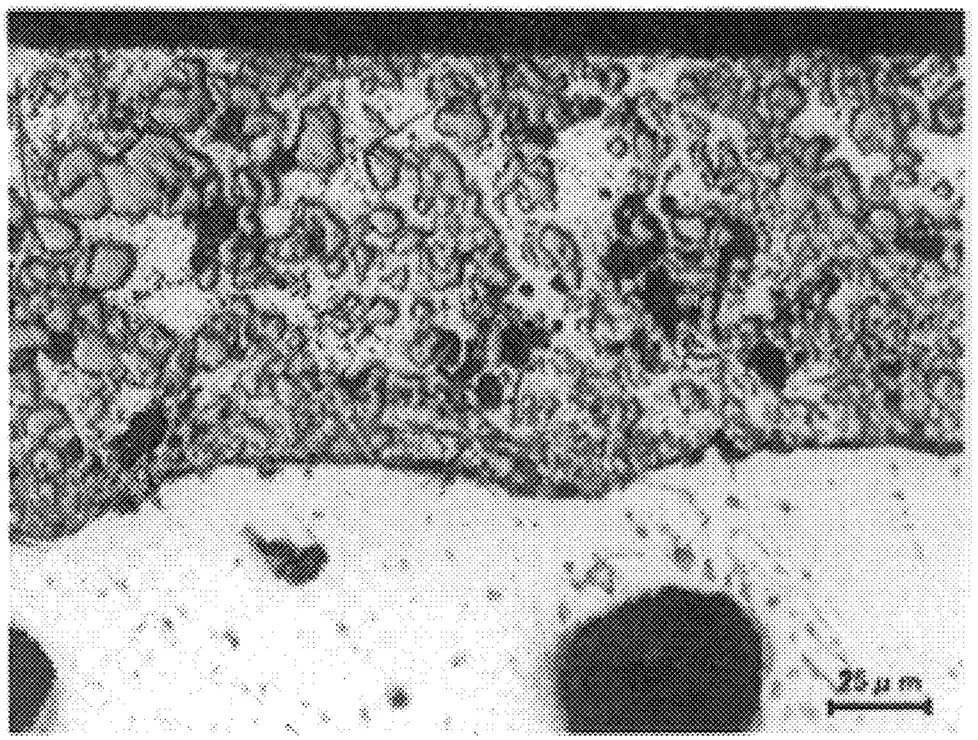
FIG. 2 is a photograph showing the microscopic structure of the flame-sprayed aluminum-alloy according to Example 1.

A mixture of metal powder was prepared to provide the compositions of Al—40% Si. Meanwhile, commercially available pure-aluminum rolled sheets were subjected to shot-blasting by steel grids (0.7 mm of size) to roughen the surface to Rz 45 μm.

Using an HVOF type flame-spraying machine (DJ, product of Sulzer Meteco Co., Ltd.) the flame spraying was carried out under the following conditions.

Oxygen pressure: 150 psi

Fuel pressure: 100 psi

Flame-spraying distance: 180 mm

Thickness of flame-sprayed layer: 200 μm

The resultant flame-sprayed layer had hardness of Hv=180–250, and average size of granular Si particles of 3 μm. The surface of the flame-sprayed layer was finished to Rz 1.2 μm. The wear test was then carried out under the following conditions.

COMPARATIVE EXAMPLE 1

The flame-sprayed layer of pure aluminum was formed under the same conditions as in Example 1. The same wear test was carried out.

COMPARATIVE EXAMPLE 2

An Al—Si alloy containing 17% of Si was cast in a sand mold to prepare a test specimen.

Testing machine: three-pin/disc friction wear testing machine

Load: 40 kg/$cm^2$

Number of revolutions: 700 rpm

Lubrication: ice machine oil+cooling media gas (R134a)

Testing time: 120 minutes

The results are shown in the following Table 1, together with

TABLE 1

| | Wear Amount (μm) |
|---|---|
| Example 1 | 3 |
| Comparative Example 1 | 50 |
| Comparative Example 2 | 4 |

INDUSTRIAL APPLICABILITY

As is described hereinabove, the hyper-eutectic Al—Si alloy can be easily formed as the sliding layer of a swash plate. In addition, since the performance of the inventive alloy is superior to that of the conventional melted Al—Si alloy, the present invention therefore greatly contributes to enhance the performance of the swash-plate type compressor.

What is claimed is:

1. A swash-plate of a swash-plate compressor, wherein a flame-sprayed layer deposited on a substrate contains from 12 to 60% by weight of Si, the balance being essentially Al, and granular Si particles dispersed in the flame-sprayed layer are spheroidal, nodular, polygonal or irregular shape not classified as the primary Si crystals or the Si crystals of a rolled alloy, and further a film is deposited on said flame-sprayed aluminum layer.

2. A swash-plate of a swash-plate compressor according to claim 1, wherein said film comprises one material selected from the group consisting of Sn, Pb—Sn, $MoS_2$, and $MoS_2$-graphite.

3. A swash-plate of a swash-plate compressor according to claim 1 or 2, wherein the Si content is from 15 to 50% by weight.

4. A swash-plate of a swash-plate compressor according to claim 3, wherein said flame-sprayed layer contains at least one element selected from the group consisting of: from 0.1 to 30% by weight of Sn, 7.0% by weight or less of Cu, 5.0% by weight or less of Mg, 1.5% by weight or less of Mn, 1.5% by weight or less of Fe, and 8.0% by weight or less of Ni.

5. A swash-plate of a swash-plate compressor according to claim 3, wherein said substrate is a metal substrate, the surface of which is roughened.

6. A swash-plate of a swash-plate compressor according to claim 5, wherein said flame-sprayed layer contains at least one element selected from the group consisting of: from 0.1 to 30% by weight of Sn, 7.0% by weight or less of Cu, 5.0% by weight or less of Mg, 1.5% by weight or less of Mn, 1.5% by weight or less of Fe, and 8.0% by weight or less of Ni.

7. A swash-plate of a swash-plate compressor according to claim 3, wherein the concentration of Si is changed in the flame-sprayed layer such that its concentration increases in a direction from the substrate side toward the surface.

8. A swash-plate of a swash-plate compressor according to claim 3, wherein the average particle size of said granular Si particles is 50 μm or less.

9. A swash-plate of a swash-plate compressor according to claim 8, wherein said flame-sprayed layer contains at least one element selected from the group consisting of: from 0.1 to 30% by weight of Sn, 7.0% by weight or less of Cu, 5.0% by weight or less of Mg, 1.5% by weight or less of Mn, 1.5% by weight or less of Fe, and 8.0% by weight or less of Ni.

10. A swash-plate of a swash-plate compressor according to claim 8, wherein said substrate is a metal substrate, the surface of which is roughened.

11. A swash-plate of a swash-plate compressor according to claim 3, wherein the concentration of Si is changed in the flame-sprayed layer such that its concentration increases in a direction from the substrate side toward the surface.

* * * * *